United States Patent
Gao et al.

(10) Patent No.: US 10,663,419 B2
(45) Date of Patent: May 26, 2020

(54) SILICON OIL SENSOR

(71) Applicants: Tyco Electronics (Shanghai) Co. Ltd., Shanghai (CN); Tyco Electronics Corporation, Berwyn, PA (US)

(72) Inventors: Ting Gao, Sunnyvale, CA (US); Zhongxi Huang, Shanghai (CN); Lizhang Yang, Shanghai (CN); Jing Wu, Apex, NC (US)

(73) Assignees: Tyco Electronics (Shanghai) Co., Ltd., Shanghai (CN); Tyco Electronics Corporation, Berwyn, PA (US)

( * ) Notice: Subject to any disclaimer, the term of this patent is extended or adjusted under 35 U.S.C. 154(b) by 953 days.

(21) Appl. No.: 14/807,128

(22) Filed: Jul. 23, 2015

(65) Prior Publication Data

US 2015/0330930 A1    Nov. 19, 2015

Related U.S. Application Data

(63) Continuation of application No. PCT/IB2013/061139, filed on Dec. 19, 2013.

(30) Foreign Application Priority Data

Jan. 25, 2013  (CN) .......................... 2013 1 0030267

(51) Int. Cl.
| | | |
|---|---|---|
| G01R 31/04 | (2006.01) | |
| G01N 27/12 | (2006.01) | |
| G01N 27/20 | (2006.01) | |
| G01M 3/04 | (2006.01) | |

(52) U.S. Cl.
CPC ............ *G01N 27/12* (2013.01); *G01M 3/045* (2013.01); *G01N 27/126* (2013.01); *G01N 27/20* (2013.01)

(58) Field of Classification Search
CPC ............................. G01N 27/126; G01N 27/20
See application file for complete search history.

(56) References Cited

U.S. PATENT DOCUMENTS

| | | | |
|---|---|---|---|
| 4,631,952 A | 12/1986 | Donaghey | |
| 4,855,706 A | 8/1989 | Hauptly | |
| 4,961,064 A * | 10/1990 | Hara ...................... | G01M 3/045 338/225 |
| 4,965,698 A * | 10/1990 | Thoma .................... | G01M 3/16 29/25.42 |
| 5,150,603 A * | 9/1992 | Boenning ............... | G01M 3/16 73/31.05 |
| 5,256,574 A | 10/1993 | Neuberger et al. | |
| 5,679,888 A * | 10/1997 | Tohda .................... | B82Y 35/00 374/E7.03 |
| 7,071,722 B2 * | 7/2006 | Yamada ............. | G01R 1/06772 324/755.09 |

(Continued)

FOREIGN PATENT DOCUMENTS

JP     0794335 A     4/1995

OTHER PUBLICATIONS

Abstract of JPH0794335(A), dated Apr. 7, 1995, 2 pages.
International Search Report, International Application No. PCT/IB2013/061139, dated May 16, 2014, 5 pages.

*Primary Examiner* — Thang X Le
(74) *Attorney, Agent, or Firm* — Barley Snyder

(57) ABSTRACT

A silicon oil sensor has a conductive layer made of an organic silicone polymer doped with conductive particles.

8 Claims, 3 Drawing Sheets

(56) References Cited

U.S. PATENT DOCUMENTS

| | | | | |
|---|---|---|---|---|
| 2001/0037681 A1* | 11/2001 | Shibue | ............... | G01N 27/121 |
| | | | | 73/335.02 |
| 2009/0207051 A1* | 8/2009 | Yamamoto | ............ | G06F 3/0414 |
| | | | | 341/5 |
| 2011/0041588 A1* | 2/2011 | Bailey | .................. | G01N 19/10 |
| | | | | 73/31.05 |
| 2011/0108936 A1* | 5/2011 | Meng | ...................... | G01L 1/005 |
| | | | | 257/419 |
| 2013/0320467 A1* | 12/2013 | Buchanan | ............ | G01N 29/022 |
| | | | | 257/419 |

* cited by examiner

SILICON OIL SENSOR

CROSS-REFERENCE TO RELATED APPLICATION

This application is a continuation of PCT International Application No. PCT/IB2013/061139 filed on Dec. 19, 2013, which claims priority under 35 U.S.C. § 119(a)-(d) or (f) to Chinese Patent Application No. 2013100302670 filed on Jan. 25, 2013.

FIELD OF THE INVENTION

The invention is generally related to a silicon oil sensor, and, more particularly, to a silicon oil sensor that detects leaking silicon oil from an electrical power terminal filled with silicon oil.

BACKGROUND

Outdoor electrical power terminals filled with silicon oil are conventionally used in connection with high voltage cables, such as cables carrying 170 kV or greater voltage. However, there is a risk that the silicon oil may leak out of the power terminal and cause a power failure. Furthermore, since the power terminal is often mounted high above the ground, it can be difficult to monitor the power terminal for any leaking silicon oil before the power terminal fails.

Generally these conventional power terminals employ a silicon oil sensor having a conductive layer directly formed by conductive particles or a porous material (e.g. polytetrafluoroethylene) filled by the conductive particles. When the silicon oil flows to the conductive layer of the silicon oil sensor, the conductive particles directly contact the silicon oil and become covered by the silicon oil. This causes a change in the electric resistance of the conductive layer, allowing for detection of leaked silicon oil is leaked based on the change of the electric resistance of the conductive layer.

While the conventional silicon oil sensor can detect certain types of silicon oil leaks, it suffers from a number of disadvantages.

For example, when the conductive particles are covered by the leaked silicon oil, the change of the electric resistance of the conductive layer is very slow and not significant. Thus, the conventional silicon oil sensor suffers from poor detection sensitivity and is unable to detect silicon oil leaks that occur slowly over time. As a result, the conventional silicon oil sensor is unable to reliably detect slow leaks, and thus provide warnings prior to power failure.

Additionally, the electric resistance of the conductive layer is also affected by other fluids, such as rain water. Thereby, when the conventional silicon oil sensor is used in an outdoor environment, a special film is often applied on the conductive layer to protect it from the rain water. The film is designed to permit the silicon oil to penetrate therethrough, however, such a film complicates the structure of the silicon oil sensor, adds a potential failure point, and increases the manufacturing cost.

SUMMARY

A silicon oil sensor has a conductive layer made of an organic silicone polymer doped with conductive particles.

BRIEF DESCRIPTION OF THE DRAWINGS

The invention will now be described by way of example, with reference to the accompanying Figures, of which.

DETAILED DESCRIPTION OF THE EMBODIMENT(S)

Figure 1:
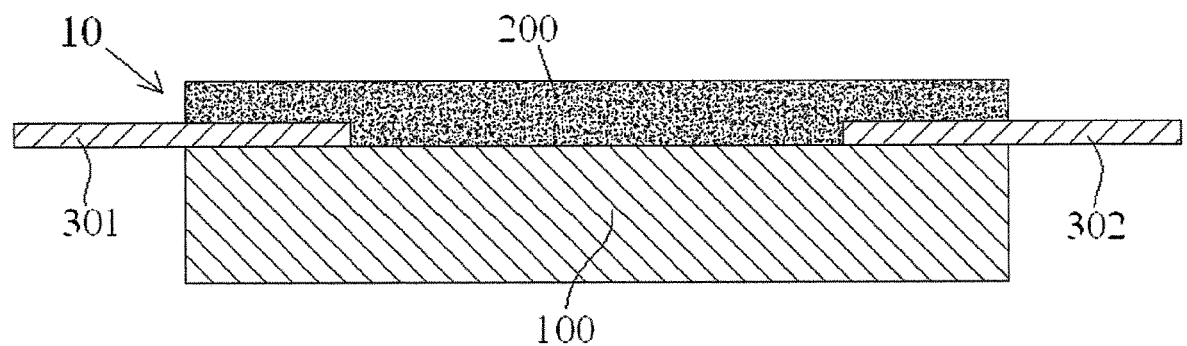
FIG. 1 is a cross-sectional view of a silicon oil sensor.

Exemplary embodiments of the invention will be described hereinafter in detail with reference to the attached Figures, wherein the like reference numerals refer to the like elements. The invention may, however, be embodied in many different forms and should not be construed as being limited to the embodiments set forth herein; rather, these embodiments are provided so that the disclosure will be thorough and complete, and will fully convey the concept of the invention to those of ordinary skill in the art.

In an embodiment shown in FIG. 1, the silicon oil sensor 10 has an insulating body 100, a first electrode 301 and a second electrode 302 disposed on a surface of the insulating body 100, and a conductive layer 200 disposed on the surface of the insulating body 100 and electrically contacting the first and second electrodes 301, 302.

In an embodiment, the insulating body 100 and the pair of electrodes 301, 302 are a Printed Circuit Board (PCB), where the insulating body 100 is a substrate, and the pair of electrodes 301, 302 constitute a pair of metal terminals formed on the insulating body 100 by a patterning process.

In another embodiment, the insulating body 100 may be formed into a container having an opening, and the conductive layer 200 is positioned in the container.

In an embodiment, the conductive layer 200 is an organic silicone composite material, such as an organic silicone polymer doped with conductive particles. The organic silicone polymer can rapidly swell immediately after contacting silicon oil and cause the electrical resistance of the conductive layer 200 to rapidly change. In this way, the silicon oil sensor 10 can quickly detect silicon oil that leaks from the electrical power terminal based on the rapid change of the electrical resistance. Thus, a user can be alerted to the leaking electrical power quickly before a catastrophic failure occurs. Accordingly, the silicon oil sensor 10 can reliably monitor an electrical power system to help contribute to operating normally.

Furthermore, when the organic silicone polymer contacts rain water, the hydrophobic nature of the organic silicone polymer prevents absorption of the water, thus no swelling occurs, and the electrical resistance of the conductive layer 200 substantively remains unchanged. Accordingly, the silicon oil sensor 10 can be applied in an outdoor environment, and the conductive layer 200 or the entire silicon oil sensor 10 can be directly exposed in the atmosphere environment without providing any water-proof film thereon.

For example, the silicon oil sensor 10 may be simply disposed below an outdoor electrical power terminal filled with silicon oil. In this case, when the silicon oil is leaked out of the outdoor electrical power terminal, the leaked silicon oil falls onto the conductive layer 200 of the silicon oil sensor 10. As a result, the silicon oil sensor 10 simply and reliably detects the leaking silicon oil from the outdoor electrical power terminal.

In an embodiment, the organic silicone composite material is formed by mixing an organic silicone polymer with a conductive carbon powder or a conductive metal powder.

In an embodiment, the organic silicone polymer is a silicone rubber, an organic silicone adhesive, organic silicone paint, or any combination thereof.

In an embodiment, the conductive particle is carbon black powder, graphite powder, silver powder, copper powder, sliver-coated nickel powder, nickel powder, iron powder, aluminum powder, titanium carbide powder, silver-coated copper powder, silver-coated aluminum powder, silver-coated glass powder, or any combination thereof.

In the embodiment shown in FIG. 1, the conductive layer 200 is coated on a surface of the insulating body 100 on which the first and second electrodes 301, 302 have been disposed.

Hereafter, an outdoor electrical power terminal assembly having the silicon oil sensor 10 is described with reference to FIGS. 2-4.

Figure 2:
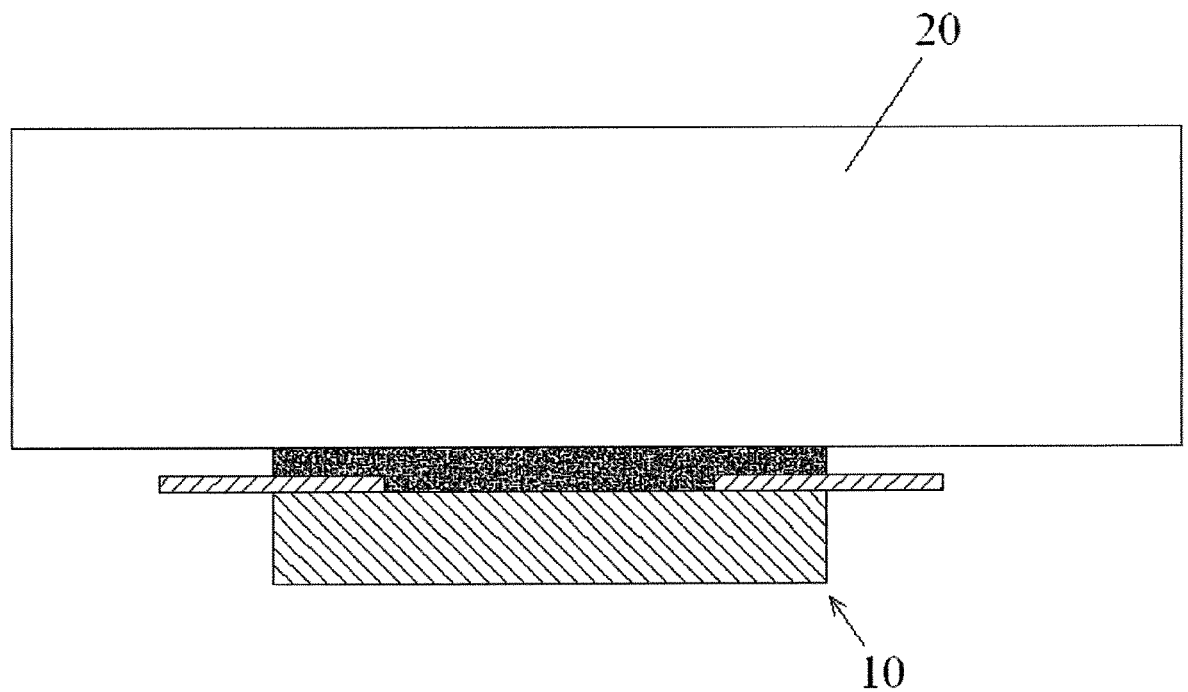
FIG. 2 is a cross-sectional view of the silicon oil sensor positioned on a horizontal surface of an electrical power terminal assembly.

In an embodiment shown in FIG. 2, the silicon oil sensor 10 is positioned on a lower horizontal surface of an outdoor electrical power terminal 20. The outdoor electrical power terminal 20 is extends in a horizontal direction. With this configuration, when silicon oil leaks out of the outdoor electrical power terminal 20, the leaked silicon oil flows to the conductive layer 200 of the silicon oil sensor 10, and the organic silicone polymer of the conductive layer 200 swells and causes the electrical resistance of the conductive layer 200 to experience a quick change in electrical resistance. Accordingly, the leaked silicon oil can be reliably detected by the silicon oil sensor 10 quickly.

Figure 3:
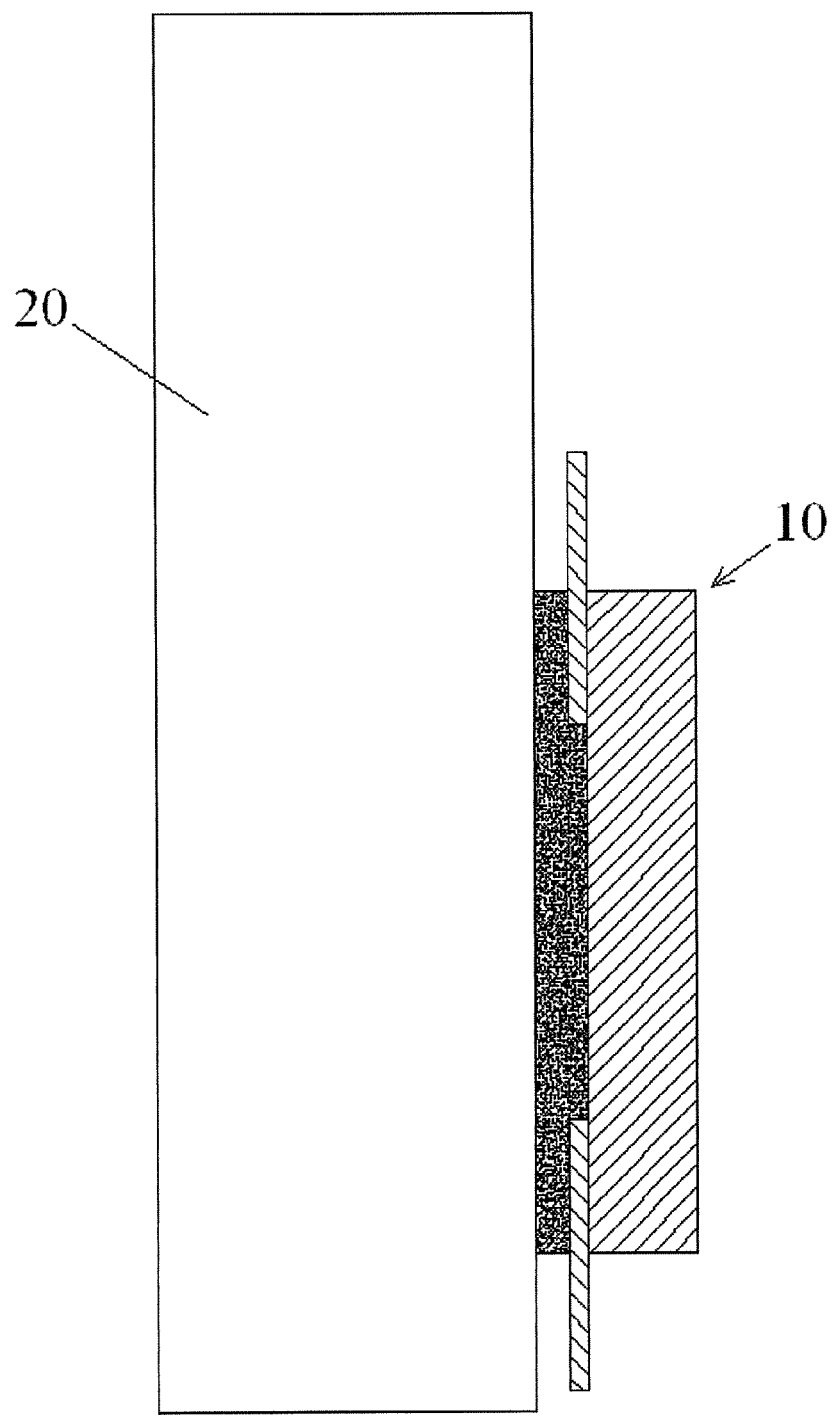
FIG. 3 is a cross-sectional view of the silicon oil sensor positioned on a vertical surface of the electrical power terminal assembly.
Figure 4:
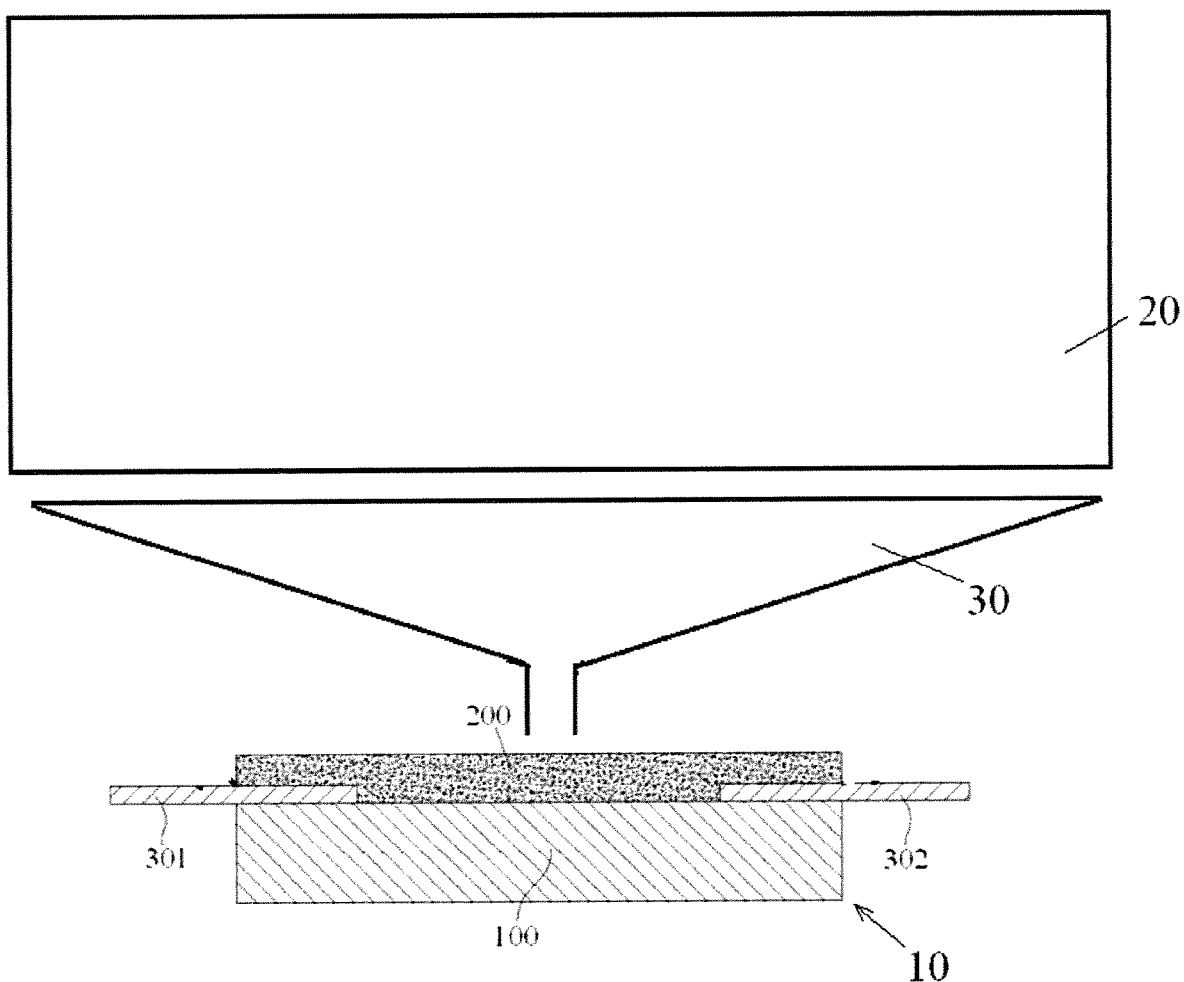
FIG. 4 is a cross-sectional view of the silicon oil sensor connected to a tapered end of a funnel connected on an opposite receiving end to the horizontal surface of the electrical power terminal assembly.

In an embodiment shown in FIG. 3, the silicon oil sensor 10 is positioned on a vertical surface of the outdoor electrical power terminal 20. The outdoor electrical power terminal 20 is positioned in a vertical direction, and the silicon oil sensor 10 is attached on a lower side surface of the vertical outdoor electrical power terminal 20. With this configuration, when silicon oil leaks out of the outdoor electrical power terminal 20, the leaked silicon oil flows to the conductive layer 200 of the silicon oil sensor 10, and the organic silicone polymer of the conductive layer 200 swells and causes the electrical resistance of the conductive layer 200 to experience a rapid increase. In this way, the leaked silicon oil can be reliably detected by the silicon oil sensor 10 quickly.

In an embodiment shown in FIG. 4, the electrical power terminal assembly 20 has a funnel 30 is positioned below the outdoor electrical power terminal 20 to collect leaking silicon oil from the outdoor electrical power terminal 20 and to direct the leaking silicon oil to the silicon oil sensor 10.

The funnel 30 is positioned below the electrical power terminal 20, and the silicon oil sensor 10 is positioned below the funnel 30. The funnel 30 has a flared inlet upward facing the electrical power terminal 20 to catch and receive silicon oil leaking out of the electrical power terminal 20, and an opposite tapered outlet downward facing the silicon oil sensor 10 to discharge the leaked silicon oil onto the silicon oil sensor 10. With this configuration, the leaking silicon oil can be collected and converged by the funnel 30 and discharged onto the conductive layer 200 of the silicon oil sensor 10. Thereby, even if the amount of oil leakage is very small, it can still be reliably detected by the silicon oil sensor 10.

In an embodiment, the conductive layer 200 of the silicon oil sensor 10 is formed by a conductive silicone rubber coating layer. By varying a thickness of the conductive silicone rubber coating layer, and the type and the content of conductive particles in the conductive silicone rubber, the silicon oil sensor 10 can have a predetermined resistance value. When leaking silicon oil flows to the silicon oil sensor 10, the silicone rubber of the conductive silicone rubber coating layer swells, and the electrical resistance of the silicon oil sensor 10 rapidly increases in a very short time.

The conductive organic silicone polymer for the silicon oil sensor 10 rapidly swells and quickly changes electrical resistance when in contact with silicon oil, a physical characteristic rarely displayed in other types of polymers.

Hereafter, various exemplary methods of producing the conductive organic silicone polymer based silicon oil sensor 10 are described.

Example 1

In an embodiment, the conductive organic silicone polymer is produced by coating a liquid silicone rubber doped with conductive carbon black powder on a pair of electrodes 301,302 and between the pair of electrodes 301,302 to form a thin film.

The thin film is placed in an oven to dry and cure the thin film at a temperature of approximately 160° C. for a time period of approximately 2 hours. The thin film is then cooled to room temperature to obtain a silicone rubber coating layer containing approximately 11.9 wt % conductive carbon black powder.

The silicone rubber coating layer has a stable resistance of 7.981 k$\Omega$ between the pair of electrodes 301,302 at room temperature. When a droplet of silicon oil is applied to the silicone rubber coating layer, the resistance of the silicone rubber coating layer is increased from 7.98 k$\Omega$ to 12.45 k$\Omega$ within half an hour. Thus, the resistance of the silicone rubber coating layer is increased by 56.0%.

Example 2

In an embodiment, the conductive organic silicone polymer is produced by coating a liquid silicone rubber doped with conductive carbon black powder on a pair of electrodes 301,302 and between the pair of electrodes 301,302 to form a thin film.

The thin film is placed in an oven to dry and cure the thin film at a temperature of about 160° C. for a time period of about 2 hours. The thin film is then cooled to room temperature to obtain a silicone rubber coating layer containing 20.6 wt % conductive carbon black powder.

The silicone rubber coating layer has a stable resistance of 1.75 k$\Omega$ between the pair of electrodes 301,302 at room temperature. When a droplet of silicon oil is applied to the silicone rubber coating layer, the resistance of the silicone rubber coating layer is increased from 1.75 k$\Omega$ to 2.86 k$\Omega$ within half an hour. Thus, the resistance of the silicone rubber coating layer is increased by 63.4%.

Example 3

In an embodiment, the conductive organic silicone polymer is produced by coating a liquid silicone rubber doped with silver powder on a pair of electrodes 301,302 and between the pair of electrodes 301,302 to form a thin film.

The thin film is placed in an oven to dry and cure the thin film at a temperature of about 160° C. for a time period of about 2 hours. The thin film is then cooled to room temperature to obtain a silicone rubber coating layer containing 80.2 wt % silver powder.

The silicone rubber coating layer has a stable resistance of 0.21 kΩ between the pair of electrodes 301,302 at room temperature. When a droplet of silicon oil is applied to the silicone rubber coating layer, the resistance of the silicone rubber coating layer is increased from 0.21 kΩ to 0.41 kΩ within half an hour. Thus, the resistance of the silicone rubber coating layer is increased by 95.2%.

Example 4

In an embodiment, the conductive organic silicone polymer is produced by coating a liquid silicone rubber doped with sliver-coated nickel powder on a pair of electrodes 301,302 and between the pair of electrodes 301,302 to form a thin film.

The thin film is placed in an oven to dry and cure the thin film at a temperature of about 160° C. for a time period of about 2 hours. The thin film is then cooled to room temperature to obtain a silicone rubber coating layer containing 74.3 wt % sliver-coated nickel powder.

The silicone rubber coating layer has a stable resistance of 0.48 kΩ between the pair of electrodes 301,302 at room temperature. When a droplet of silicon oil is applied to the silicone rubber coating layer, the resistance of the silicone rubber coating layer is increased from 0.48 kΩ to 0.85 kΩ within half an hour. Thus, the resistance of the silicone rubber coating layer is increased by 77.1%.

Example 5

In an embodiment, the conductive organic silicone polymer is produced by coating a liquid silicone rubber doped with copper powder on a pair of electrodes 301,302 and between the pair of electrodes 301,302 to form a thin film.

The thin film is placed in an oven to dry and cure the thin film at a temperature of about 160° C. for a time period of about 2 hours. The thin film is then cooled to room temperature to obtain a silicone rubber coating layer containing 72.3 wt % copper powder.

The silicone rubber coating layer has a stable resistance of 0.68 kΩ between the pair of electrodes 301,302 at the room temperature. When a droplet of silicon oil is dropped to the silicone rubber coating layer, the resistance of the silicone rubber coating layer is increased from 0.68 kΩ to 1.16 kΩ within half an hour. Thus, the resistance of the silicone rubber coating layer is increased by 70.6%.

Those of ordinary skill in the art would appreciate that the above embodiments are intended to be exemplary, and not restrictive. For example, many modifications may be made to the above embodiments by those skilled in this art, and various features described in the different embodiments may be freely combined with each other without conflicting in configuration or principle, so that more types of silicon oil sensors can be achieved.

Although several exemplary embodiments have been shown and described, those of ordinary skill in the art would appreciate that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "an embodiment" are not intended to be interpreted as excluding the existence of additional embodiments that also incorporate the recited features. Moreover, unless explicitly stated to the contrary, embodiments "comprising" or "having" or "including" an element or a plurality of elements having a particular property may include additional such elements not having that property.

What is claimed is:

1. A silicon oil sensor, comprising:
a conductive layer made of an organic hydrophobic silicone polymer doped with conductive particles, the conductive particles being chosen from the following: conductive carbon black powder 11.9 wt %, conductive carbon black powder 20.6 wt %, silver powder 80.2 wt %, silver-coated nickel powder 74.3 wt % or copper powder 72.3 wt % or any combination thereof, the organic hydrophobic silicone polymer has a swelled size when in contact with a silicon oil and a contracted size having a smaller volume than the swelled size, the organic hydrophobic silicone polymer has an electrical resistance in the swelled size that is between 50% and 100% greater than in the contracted size.

2. The silicon oil sensor according to claim 1, wherein the organic hydrophobic silicone polymer is made of silicone rubber, organic silicone adhesive, organic silicone paint, or any combination thereof.

3. The silicon oil sensor according to claim 1, wherein the conductive particle is, graphite powder, nickel powder, iron powder, aluminum powder, titanium carbide powder, silver-coated copper powder, silver-coated aluminum powder, silver-coated glass powder, or any combination thereof.

4. The silicon oil sensor according to claim 1, further comprising a first electrode electrically connected to the conductive layer.

5. The silicon oil sensor according to claim 4, further comprising a second electrode electrically connected to the conductive layer and spaced a distance from the first electrode.

6. The silicon oil sensor according to claim 5, further comprising an insulating body having a receiving surface on which the first and second electrodes are positioned.

7. The silicon oil sensor according to claim 6, wherein the conductive layer is coated on the receiving surface of the insulating body.

8. The silicon oil sensor according to claim 6, wherein the conductive layer is coated on the first electrode and the second electrode, and coated on the receiving surface of the insulating body extending between the first electrode and the second electrode.

\* \* \* \* \*